United States Patent
Chen

(10) Patent No.: US 8,009,362 B1
(45) Date of Patent: Aug. 30, 2011

(54) DISPLAY DEVICE AND LIGHT ENHANCEMENT FILM OF THE DISPLAY DEVICE

(75) Inventor: Chih-Yen Chen, Hsin-Chu (TW)

(73) Assignee: AU Optronics Corporation, Hsin-Chu (TW)

(*) Notice: Subject to any disclaimer, the term of this patent is extended or adjusted under 35 U.S.C. 154(b) by 0 days.

(21) Appl. No.: 12/791,002

(22) Filed: Jun. 1, 2010

(30) Foreign Application Priority Data

Feb. 12, 2010 (TW) .............................. 99104819 A

(51) Int. Cl.
  *G02B 27/10* (2006.01)
  *G02B 3/08* (2006.01)
(52) U.S. Cl. ........ 359/619; 359/628; 359/741; 359/296; 362/268; 362/342; 136/246; 136/259; 438/71
(58) Field of Classification Search .................. 359/296, 359/452, 454, 455, 462, 463, 619, 621, 623, 359/625, 628, 629, 642, 665, 741; 362/231, 362/235, 268, 244, 471, 511, 625, 626; 358/3.01, 358/3.24, 515; 136/246, 256; 257/99
See application file for complete search history.

(56) References Cited

U.S. PATENT DOCUMENTS

| | | | |
|---|---|---|---|
| 5,165,186 A * | 11/1992 | Smith | 40/427 |
| 5,520,568 A * | 5/1996 | Craighead et al. | 451/42 |
| 6,037,535 A * | 3/2000 | Yoshino | 136/246 |
| 6,079,854 A * | 6/2000 | Ra | 362/342 |
| 6,520,666 B1 * | 2/2003 | Beyerlein et al. | 362/471 |
| 7,068,433 B2 * | 6/2006 | Hayashi et al. | 359/619 |
| 7,195,872 B2 * | 3/2007 | Agrawal et al. | 435/6 |
| 7,290,919 B2 | 11/2007 | Pan et al. | |
| 7,492,513 B2 * | 2/2009 | Fridman et al. | 359/462 |
| 7,535,644 B2 * | 5/2009 | De Boeij et al. | 359/619 |
| 7,576,918 B2 * | 8/2009 | Goggins | 359/619 |
| 7,701,642 B2 * | 4/2010 | Obinata | 359/665 |
| 7,745,313 B2 * | 6/2010 | Wang et al. | 438/479 |
| 7,887,197 B2 * | 2/2011 | Iwanaga | 353/94 |
| 2008/0117515 A1 | 5/2008 | Hsu et al. | |

FOREIGN PATENT DOCUMENTS

| | | |
|---|---|---|
| CN | 100385316 C | 4/2008 |
| CN | 101191868 A | 6/2008 |

* cited by examiner

*Primary Examiner* — Loha Ben
(74) *Attorney, Agent, or Firm* — CKC & Partners Co., Ltd.

(57) ABSTRACT

A light enhancement film provided in the disclosure includes a substrate and an optical microstructure having a plurality of hexagonal cylindrical lenses inseparably arranged on a surface of the substrate in accordance with a honeycombed arrangement. Each of the hexagonal cylindrical lenses has different cross-sectional areas that are gradually narrowed from the surface of the substrate in a direction away from the substrate, and every two adjacent lenses have a gap therebetween. Furthermore, a display device having the light enhancement film is provided as well.

19 Claims, 5 Drawing Sheets

DISPLAY DEVICE AND LIGHT ENHANCEMENT FILM OF THE DISPLAY DEVICE

RELATED APPLICATIONS

This application claims priority to Taiwan Application Serial Number 99104819, filed Feb. 12, 2010, which is herein incorporated by reference.

BACKGROUND

1. Technical Field

The disclosure relates to a display device, more particularly to a display device and its light enhancement film.

2. Description of Related Art

A traditional electrophoretic display (EPD) has an upper substrate, a lower substrate, and an electrophoretic film arranged between the upper substrate and the lower substrate. If the electrophoretic display does not have a brightness enhancement film (BEF) arranged thereon, after external lights arrive the electrophoretic film via the upper substrate, because reflected lights from the electrophoretic film cannot be effectively transmitted outwards the electrophoretic display by the upper substrate, the light intensity of the reflected lights from the electrophoretic film for a viewer is degraded.

Therefore, the brightness enhancement film (BEF) can be arranged in the electrophoretic display to enhance the light intensity thereof, in which the brightness enhancement film (BEF) normally has a micro structural layer thereon. The micro structural layer has a plurality of microstructures. The microstructures are presented as pillars which are lain parallel and interspaced on a surface of the brightness enhancement film.

When an incident light from an external light source is transmitted into the electrophoretic display and travels to the electrophoretic film in a direction parallel to the parallel pillars, the light intensity of the electrophoretic display can be improved positively, so as to upgrade the quality of the display for the viewer. However, when another incident light from the external light source is transmitted into the electrophoretic display and travels to the electrophoretic film in another direction perpendicular to the parallel pillars, the light intensity of the electrophoretic display cannot be improved, and degrades the quality of the display for the viewer Therefore, how to develop a brightness enhancement film (BEF) for improving the mentioned disadvantages and inconveniences shall be concerned.

SUMMARY

Therefore, an aspect of the present disclosure is to present a display device and its light enhancement film, which enables different directional incident lights to be respectively reflected outward from the display device after the lights move into the light enhancement film, so as to increase the light intensity of the display device.

In a practice of the disclosure, the light enhancement film has a substrate and an optical microstructure. The optical microstructure has a plurality of hexagonal cylindrical lenses (hexagonal pillar lenses or hexagonal prisms) inseparably arranged on a surface of the substrate in accordance with a honeycombed arrangement. Each of the hexagonal cylindrical lenses is gradually narrowed in girth or cross-section area from the substrate in a direction away from the substrate. Thus, each of the hexagonal cylindrical lenses has a largest cross-sectional area on the surface of the substrate, and each of the hexagonal cylindrical lenses has a smallest cross-sectional area furthest away from the substrate. Also, two corresponding surfaces of every two adjacent hexagonal cylindrical lenses are spaced by a gap between the two adjacent hexagonal cylindrical lenses. In another practice of the disclosure, the display device has a reflective display module, a light enhancement film, and a transparent adhesive layer. The optical microstructure has a plurality of hexagonal cylindrical lenses inseparably arranged on a surface of the substrate in accordance with a honeycombed arrangement. Each of the hexagonal cylindrical lenses is gradually narrowed in girth or cross-section area from the substrate in a direction away from the substrate. Thus, each of the hexagonal cylindrical lenses has a largest cross-sectional area on the surface of the substrate, and each of the hexagonal cylindrical lenses has a smallest cross-sectional area furthest away from the substrate. Also, two corresponding surfaces of every two adjacent hexagonal cylindrical lenses are spaced by a gap between the two adjacent hexagonal cylindrical lenses. The light-transmissive adhesive layer is sandwiched between the reflective display module and the light enhancement film for sticking and fixing the hexagonal cylindrical lenses on the reflective display module.

To sum up, by the appearance of the hexagonal cylindrical lenses of the light enhancement film, the disclosure of the display device and its light enhancement film provide lights to travel within the display device via the hexagonal cylindrical lenses on one side, and enhance light intensity to a viewer by adjusting the traveling path of the reflective lights to the viewer on the other side. Thus, the display device can further provide better brightness of reflective lights and displaying performances.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
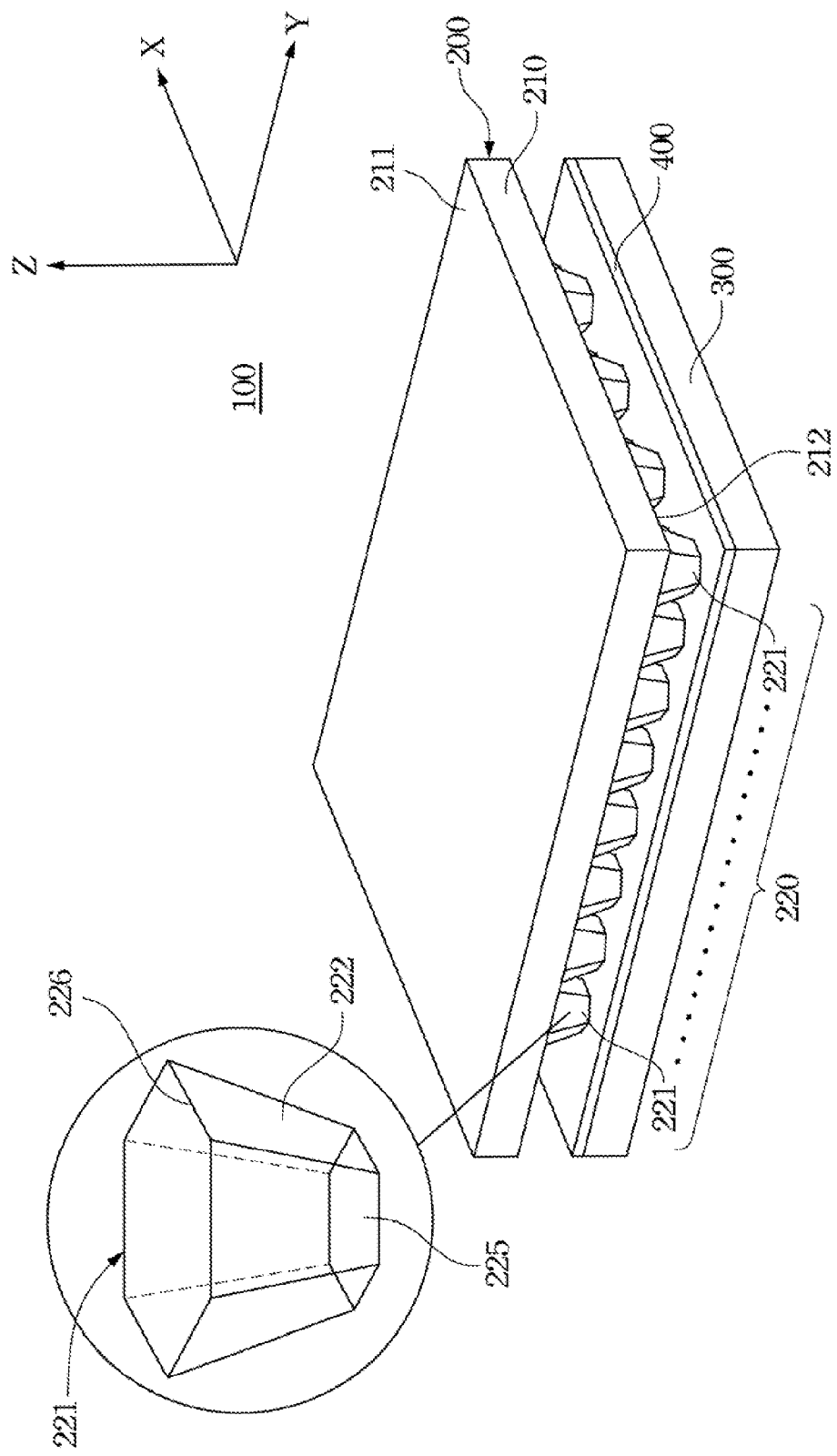
FIG. 1 is a schematic view of a display device and its light enhancement film and an enlarged view of a hexagonal cylindrical lens in accordance with one embodiment of the present disclosure.
Figure 2:
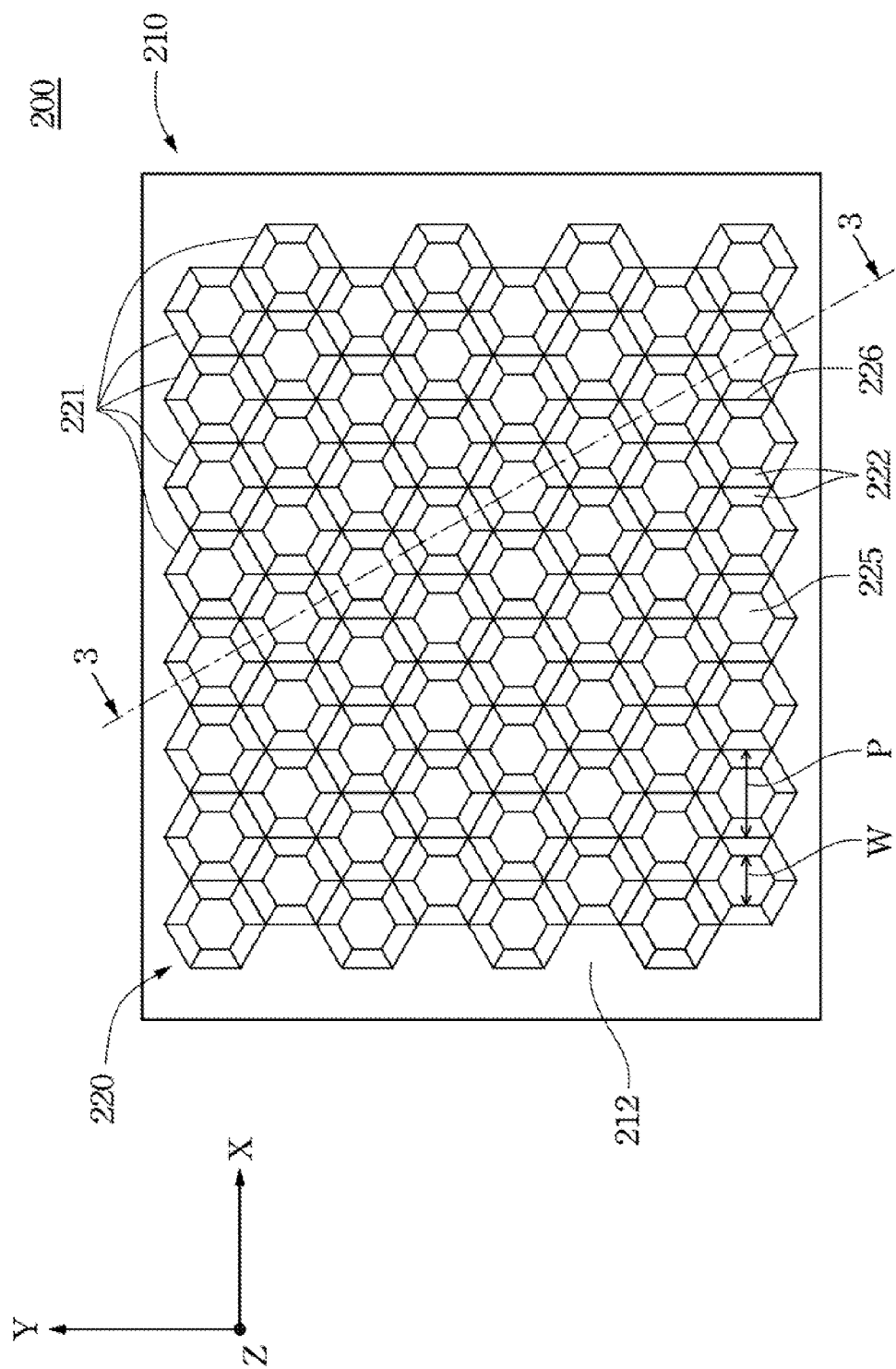
FIG. 2 is a schematic view of the optical microstructure observed from a direction from the light-transmissive adhesive layer of FIG. 1.
Figure 3:
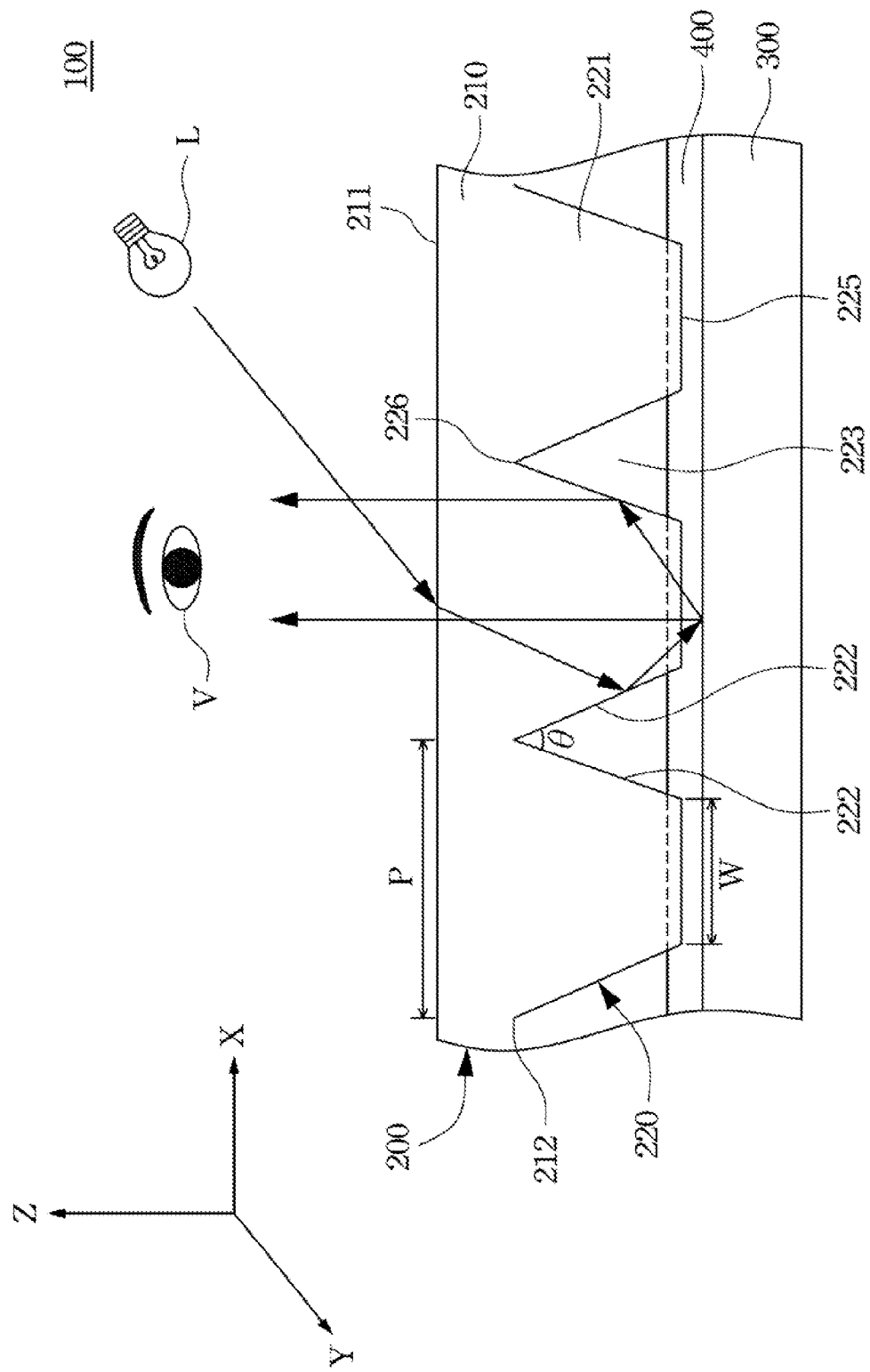
FIG. 3 is a cross-sectional view along a line 3-3 in FIG. 2 and a schematic view of light traveling.

Refer to FIG. 1, FIG. 2 and FIG. 3. FIG. 1 is a schematic view of a display device and its light enhancement film and an enlarged view of a hexagonal cylindrical lens (hexagonal pillar lenses or hexagonal prisms) in accordance with one embodiment of the present disclosure. FIG. 2 is a schematic view of the optical microstructure observed from a direction from the light-transmissive adhesive layer of FIG. 1. FIG. 3 is a cross-sectional view along a line 3-3 in FIG. 2 and a schematic view of light traveling.

The present disclosure provides a display device 100 and its light enhancement film 200. The display device 100 has a light enhancement film 200, a reflective display module 300 and a light-transmissive adhesive layer 400.

The reflective display module 300, for example, can be a reflective liquid crystal display (reflective LCD) module or an electrophoretic display (EPD) module. Accordingly, the display device 100 can be a reflective liquid crystal display (reflective LCD) or an electrophoretic display (EPD).

The "reflective liquid crystal display module" has a lot of types or kinds, and one of them is on a reflective material installed below an LCD panel of the reflective liquid crystal display module so as to replace irradiation material or the back light module of the transmissive liquid crystal display to provide lights by reflecting ambient light when the ambient light is sufficiently intense. Since the reflective liquid crystal display module only provides passive reflective lights, the reflective liquid crystal display module is also named "passive liquid crystal display module". Accordingly, the reflective liquid crystal display is also called "passive liquid crystal display".

The "electrophoretic display module" is a reflective display relating to the migration of particles (micro-particles). The operating principle of the electrophoretic display module relies on the migration of charged micro-particles within a clear or color light-transmitting fluid. Generally, the charged micro-particles, when subjected to an electric field, swarm toward the electrode with the opposite polarity. The rotation or translation of such micro-particles within the fluid may cause the pixels of the display to be switched between the on and off statuses. The electrophoretic display module may be made on a glass substrate, a metal substrate or a plastic substrate.

The light enhancement film 200 at least has a substrate 210 and an optical microstructure 220. The substrate 210 is shaped as a plate, has a first surface 211 and a second surface 212 opposite with each other. The first surface 211 of the substrate 210 is neighbored with an ambient light source or an external light source L (FIG. 3) and is opposite to the optical microstructure 220. Therefore, the first surface 211 is an outward surface and the second surface 212 is an inward surface. The optical microstructure 220 is positioned on the second surface 212 of the substrate 210, and includes a plurality of hexagonal cylindrical lenses (hexagonal pillar lenses or hexagonal prisms) 221. In an option, these hexagonal cylindrical lenses 221 have the same dimension or volume, or are regular hexagonal cylindrical lenses, or are regular hexagonal cylindrical lenses with the same dimension or volume. Also, these hexagonal cylindrical lenses 221 are arranged on the second surface 212 of the substrate 210 in accordance with a honeycombed arrangement (FIG. 2).

These hexagonal cylindrical lenses 221 are inseparably connected with each other by edges 226 thereof, or every two adjacent hexagonal cylindrical lenses 221 have a same edge 226 (or share the same edge). The edges 226 of the same hexagonal cylindrical lens 221 are grouped together in the shape of a hexagon. The edges 226 are just on the second surface 212.

Other polyhedron lenses or alike also can inseparably connect with each other by theirs edges thereof or share the same edge, however, the optical performance of the polyhedron lenses is worse than the optical performance of the hexagonal cylindrical lenses.

The hexagonal cylindrical lenses 221 respectively extend from the substrate 210 in a direction away from the substrate 210. Each hexagonal cylindrical lens 221 is not equivalently sized in girth or cross-section area, each hexagonal lens 221 are gradually narrowed in girth or cross-section area from the second surface 212 of the substrate 210 in a direction away from the substrate 210, or towards the light-transmissive adhesive layer 400. Therefore, each of the hexagonal cylindrical lenses 221 has a largest hexagonal girth or cross-sectional area on the second surface 212 of the substrate 210, and a smallest hexagonal girth or cross-sectional area on a distal surface 225 of the hexagonal cylindrical lens 221 furthest away from the substrate 210. In view of that, it implies that two corresponding surfaces 222 of every two adjacent hexagonal cylindrical lenses 221 are spaced by a gap 223 between the two adjacent hexagonal cylindrical lenses 221 (FIG. 3). The light-transmissive adhesive layer 400 lies on a surface of the reflective display module 300 and sticks the distal surfaces (tip surfaces or end surfaces) 225 of the hexagonal cylindrical lenses 221 to fix the optical microstructure 220 on the reflective display module 300. Thus, the light-transmissive adhesive layer 400 is sandwiched between the reflective display module 300 and the light enhancement film 200 (FIG. 3). The light-transmissive adhesive layer 400 is made of the following materials, for example, ultraviolet curable adhesive or epoxy. Therefore, refer to FIG. 3 again, after different directional ambient incident lights from an external light source L travel into the reflective display module 300, due to the appearance of the hexagonal cylindrical lenses 221, the disclosure of the light enhancement film 200 directs the directional incident lights within the display device 100 via the hexagonal cylindrical lenses 221 compulsorily, and adjusts a traveling path that the lights reflected to a viewer V on the other side to further enhance light intensity thereof to the viewer V. Thus, the display device 100 can further provide better brightness of reflective lights and improve the display performance.

In an optional embodiment of the disclosure, refer to FIG. 3 again, the substrate 210 and the optical microstructure 220 of the light enhancement film 200 are formed integrally in one, and made of light-transmissive plastic material.

The ends of these hexagonal cylindrical lenses 221 with the largest hexagonal cross-sectional area are inseparably arranged on the second surface 212 of the substrate 210 in accordance with a honeycombed arrangement shown in FIG. 2. The hexagonal distal surfaces 225 of these hexagonal cylindrical lenses 221 with the smallest hexagonal cross-sectional areas are interspaced and arranged on a surface of the light-transmissive adhesive layer 400 or embedded in the light-transmissive adhesive layer 400 in accordance with the honeycombed arrangement shown in FIG. 2. The light-transmissive plastic material is, for example, polymethyl methacrylate (PMMA), polystyrene (PS), polycarbonate (PC), polyethylene Terephthalate (PET) or polyimides.

Figure 4:
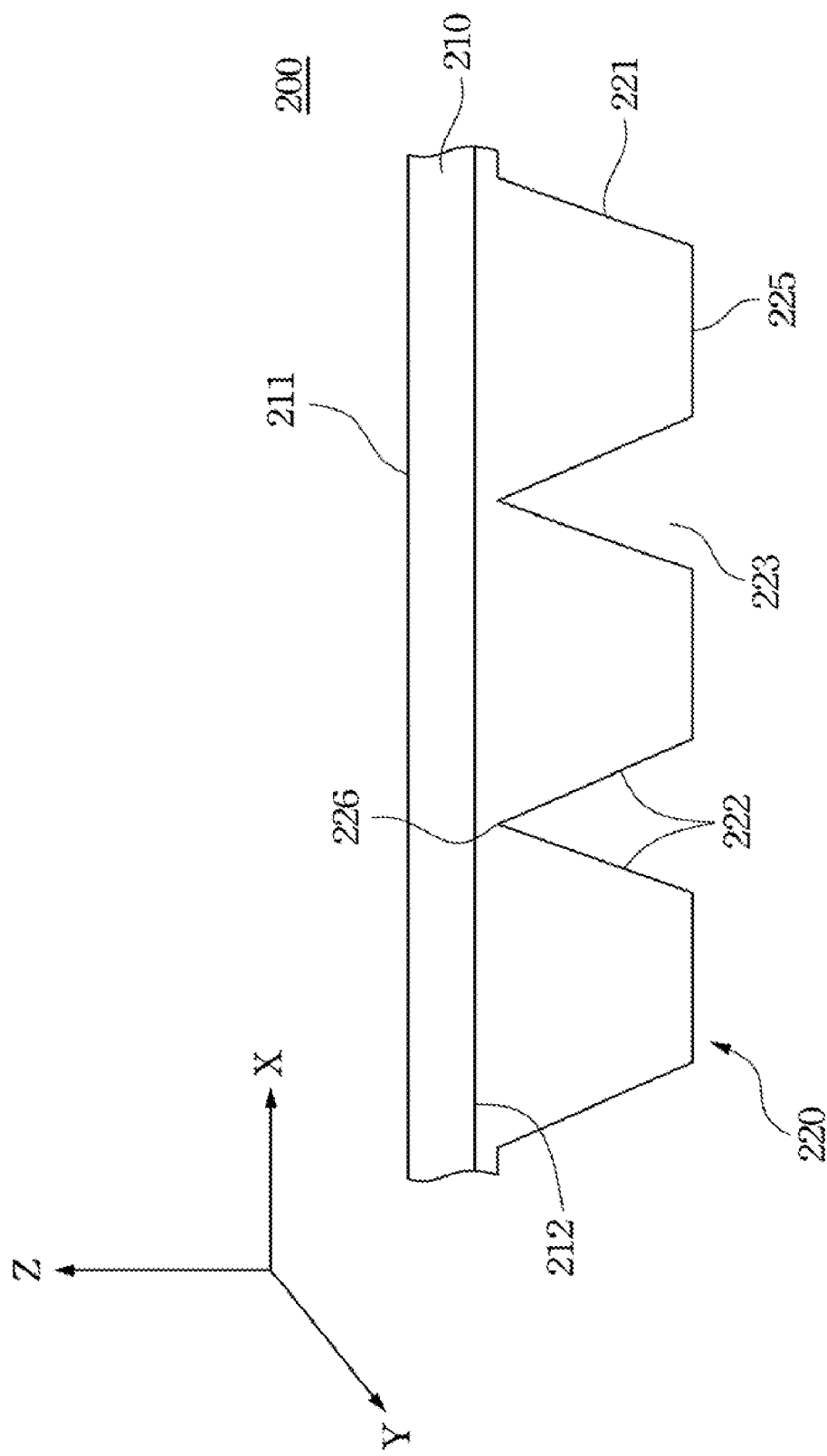
FIG. 4 is a partial schematic view of a light enhancement film in accordance with another embodiment of the present disclosure.

Refer to FIG. 4. FIG. 4 is a partial schematic view of a light enhancement film in accordance with another embodiment of the present disclosure. In an optional embodiment of the disclosure, the substrate 210 and the optical microstructure 220 of the light enhancement film 200 may not be formed integrally but formed separately and combined later.

The ends of these hexagonal cylindrical lenses 221 with the largest hexagonal cross-sectional areas are inseparably arranged in a honeycomb pattern, and connected on the second surface 212 of the substrate 210 (FIG. 4). The hexagonal distal surfaces 225 of these hexagonal cylindrical lenses 221 with the smallest hexagonal cross-sectional areas are interspaced and arranged on a surface of the light-transmissive adhesive layer 400 or embedded in the light-transmissive adhesive layer 400 in the honeycomb pattern shown in FIG. 2 or FIG. 3.

In the embodiment, we can say that the optical microstructure 220 is additionally formed on the substrate 210. The substrate 210, for example, has light-transmissive plastic material such as polyethylene Terephthalate (PET), polycarbonate (PC) or other light-transmissive plastic materials. The optical microstructure 220, for example, has ultraviolet curable material such as polymethacrylic acid or resin.

Exemplarily, substrate 210 can be a polyethylene Terephthalate (PET) film, and the optical microstructure 220 is an ultraviolet curable material layer which is embossed a plurality of hexagonal cylindrical lenses 221 thereon.

Refer to FIG. 2 and FIG. 3 or FIG. 4 again. In the other optional embodiment of the disclosure, the varied dimension or volume of the hexagonal cylindrical lenses 221 can be:

(1) An included angle θ of any value in a range from 10 degrees to 45 degrees (e.g. 10, 11, 12 . . . or 45 degrees) can be formed between the two corresponding surfaces of every two adjacent hexagonal cylindrical lenses 121 having the gap 223.

(2) A first length (pitch) P between every two parallel edges 226 of the largest cross-sectional area (FIG. 2) of each hexagonal cylindrical lens 221 on the second surface 212 of the substrate 210 can be any value in a range from 30 μm to 160 μm (e.g. 30, 31, 32 . . . or 160 μm). A second length (width) W between every two parallel edges of the hexagonal distal surfaces 225, having the smallest cross-sectional area, of each hexagonal cylindrical lens 221 can be any value in a range from 12 μm to 96 μm (e.g. 12, 13, 14 . . . or 96 μm).

(3) A ratio of the first length (pitch) P thereof and the second length (width) W thereof can be any value in a range from 0.4 to 0.6 (e.g. 0.4, 0.5 or 0.6).

The hexagonal cylindrical lenses 221 of the other optional embodiment can cooperate with any of the embodiments mentioned above to adopt the substrate 210 and the optical microstructure 220 formed integrally in one or assembled together, when the hexagonal cylindrical lenses 221 relates the dimension or volume of the length P, W and the included angle θ.

Furthermore, since the light-transmissive adhesive layer 400 tightly adheres the hexagonal distal surfaces 225 of the hexagonal cylindrical lenses 221 to the reflective display module 300, no space exists between the light-transmitting adhesive layer 400 and the hexagonal distal surfaces 225 thereof so as to prevent the lights operating from total internal reflection phenomenon, and to further retain the light intensity of the reflected lights from the reflective display module 300 for the viewer V.

Specifically, a refractive index of the hexagonal cylindrical lenses 221 and a refractive index of the light-transmissive adhesive layer 400 respectively can be any one value in a range from 1.4 to 1.7 (e.g. 1.4, 1.5, 1.6 or 1.7).

More particularly when there is barely a space between the reflective display module 300 and the hexagonal distal surfaces 225 of the hexagonal cylindrical lenses 221, the light-transmissive adhesive layer 400 and the hexagonal cylindrical lenses 221 have the same or almost the same refractive index once the light-transmissive adhesive layer 400 and the hexagonal cylindrical lenses 221 are grouped in one. Then, the embodiment can prevent the total internal reflection phenomenon caused by the reflected lights from the reflective display module 300, and further retain the light intensity of the reflected lights from the reflective display module 300 for the viewer V.

Figure 5:
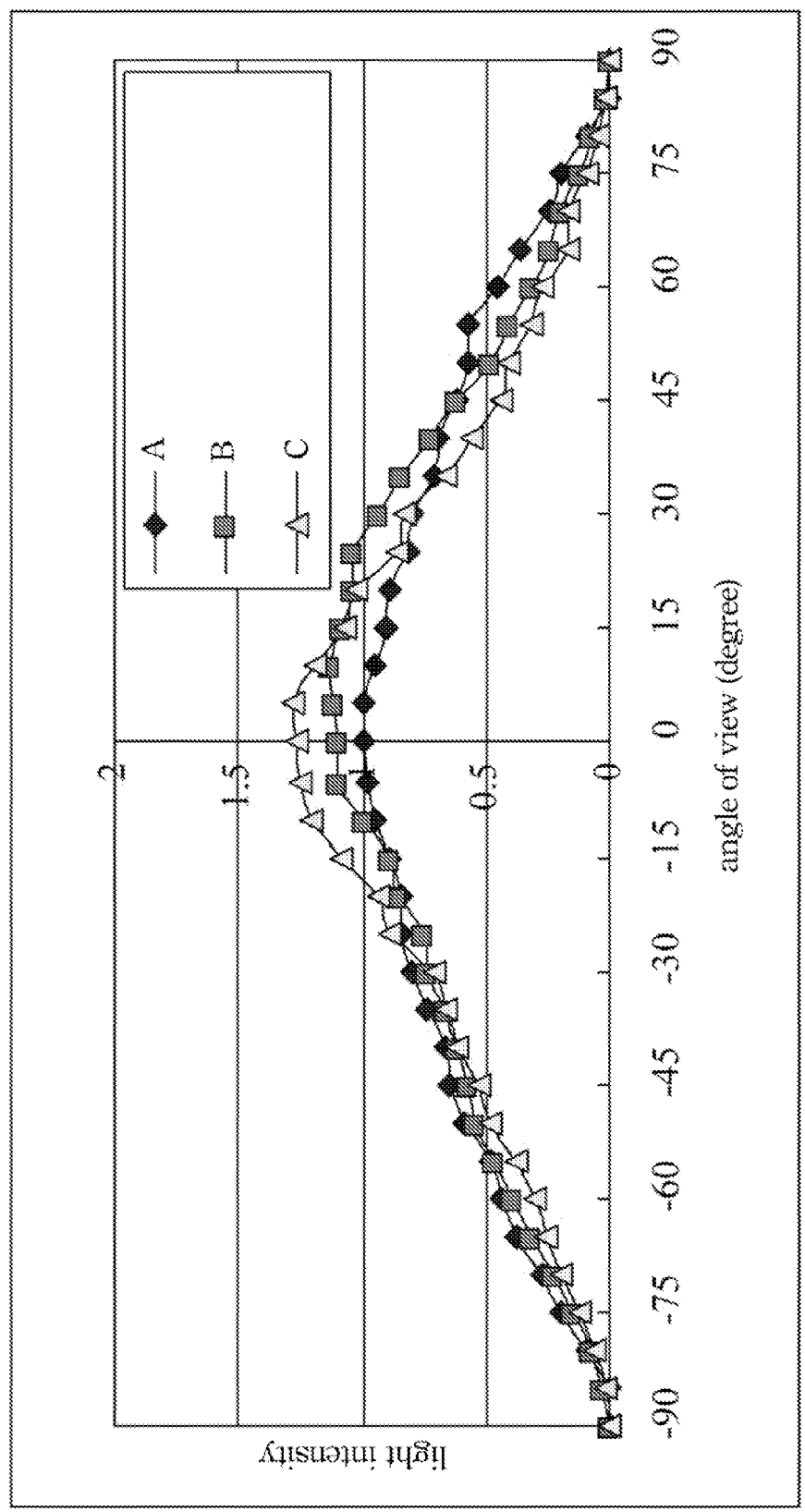
FIG. 5 is an illumination gain chart of the disclosed light enhancement film and conventional light enhancement films.

Refer to FIG. 1 and FIG. 5 in which FIG. 5 is an illumination gain chart of the disclosed light enhancement film and conventional light enhancement films.

A curve A of FIG. 5 is made according to a testing result of a conventional display module without a conventional light enhancement film to receive incident lights having a 45 degree included angle between the X axis, the Y axis and the Z axis, separately. A curve B of FIG. 5 is made according to a testing result of a conventional display module equipped with a conventional light enhancement film to receive incident lights having a 45 degree included angle between the X axis, the Y axis and the Z axis, separately. A curve C of FIG. 5 is made according to a testing result of the display device 100 of the disclosure equipped the light enhancement film 200 having the hexagonal cylindrical lenses 221 to receive incident lights having a 45 degree included angle with the X axis, the Y axis and the Z axis, separately.

As learned from the curve A and curve B, when a conventional display module is not equipped with a conventional light enhancement film the light intensity of the conventional display module at zero degree of view angle is worse than the light intensity of another conventional display module with the conventional light enhancement film at zero degree of view angle. However, when the display module 100 of the disclosure is equipped with the light enhancement film 200 having the hexagonal cylindrical lenses 221, the light intensity of the display module 100 of the disclosure at zero degree of view angle is greater than the light intensity of the other conventional display module with the conventional light enhancement film at zero degree of view angle.

Therefore, it can be inferred that the light enhancement film 200 having the hexagonal cylindrical lenses 221 provides better light intensity for viewer V (FIG. 3) at zero degree of view angle compared with that provided from the conventional light enhancement film.

To sum up, when the light enhancement film 200 of the disclosure receives different directional incident lights traveling into the light enhancement film 200, because of the appearance of the hexagonal cylindrical lenses 221, the disclosure of the light enhancement film 200 directs the directional incident lights within the display device 100 via the hexagonal cylindrical lenses 221 compulsorily, and adjusts a traveling path that the lights reflected to a viewer V to further enhance light intensity thereof to the viewer V. Thus, the display device 100 can further provide better brightness of reflective lights and displaying performances.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A light enhancement film, comprising:
a substrate; and
an optical microstructure having a plurality of hexagonal cylindrical lenses inseparably arranged on a surface of the substrate in accordance with a honeycombed arrangement,
wherein each of the hexagonal cylindrical lenses is gradually narrowed in girth from the substrate in a direction away from the substrate, and each of the hexagonal cylindrical lenses has a largest cross-sectional area on the surface of the substrate, and a smallest cross-sectional area furthest away from the substrate, wherein two corresponding surfaces of every two adjacent hexagonal cylindrical lenses are spaced by a gap between the two adjacent hexagonal cylindrical lenses.

2. The light enhancement film according to claim 1, wherein the substrate and the optical microstructure are formed integrally in one.

3. The light enhancement film according to claim 1, wherein the optical microstructure is formed on the substrate.

4. The light enhancement film according to claim 3, wherein the optical microstructure comprises an ultraviolet curable material.

5. The light enhancement film according to claim 3, wherein an included angle formed between the two corresponding surfaces of the two adjacent hexagonal cylindrical lenses having the gap is in a range from 10 degrees to 45 degrees.

6. The light enhancement film according to claim 1, wherein a length between every two parallel edges of the largest cross-sectional area of each hexagonal cylindrical lens is in a range from 30 μm to 160 μm.

7. The light enhancement film according to claim 1, wherein a length between every two parallel edges of the smallest cross-sectional area of each hexagonal cylindrical lens is in a range from 12 μm to 96 μm.

8. The light enhancement film according to claim 1, wherein a first length is defined between every two parallel edges of the largest cross-sectional area of each hexagonal cylindrical lens,
a second length is defined between every two parallel edges of the smallest cross-sectional area of each hexagonal cylindrical lens,
wherein a ratio of the first length and the second length is in a range from 0.4 to 0.6.

9. A display device, comprising:
a reflective display module;
a light enhancement film according to claim 1 disposed on the reflective display module; and
a light-transmissive adhesive layer disposed between the reflective display module and the light enhancement film.

10. The display device according to claim 9, wherein a refractive index of the hexagonal cylindrical lenses and a refractive index of the light-transmissive adhesive layer are respectively in a range from 1.4 to 1.7.

11. The display device according to claim 10, wherein the reflective display module is a reflective liquid crystal display module or an electrophoretic display module.

12. A light enhancement film, comprising:
a substrate having a surface; and
an optical microstructure having a plurality of hexagonal cylindrical lenses arranged on the surface of the substrate, and every two adjacent hexagonal cylindrical lenses share a same edge,
wherein each of the hexagonal cylindrical lenses has a largest cross-sectional area on the surface of the substrate.

13. The light enhancement film according to claim 12, wherein each of the hexagonal cylindrical lenses has a smallest cross-sectional area furthest away from the substrate.

14. The light enhancement film according to claim 13, wherein a length between every two parallel edges of the smallest cross-sectional area of each hexagonal cylindrical lens is in a range from 12 μm to 96 μm.

15. The light enhancement film according to claim 13, wherein a first length is defined between every two parallel edges of the largest cross-sectional area of each hexagonal cylindrical lens,
a second length is defined between every two parallel edges of the smallest cross-sectional area of each hexagonal cylindrical lens,
wherein a ratio of the first length and the second length is in a range from 0.4 to 0.6.

16. The light enhancement film according to claim 12, wherein each of the hexagonal cylindrical lenses is gradually narrowed in a direction away from the substrate.

17. The light enhancement film according to claim 12, wherein two corresponding surfaces of every two adjacent hexagonal cylindrical lenses are spaced by a gap between the two adjacent hexagonal cylindrical lenses.

18. The light enhancement film according to claim 17, wherein an included angle formed between the two corresponding surfaces of the two adjacent hexagonal cylindrical lenses having the gap is in a range from 10 degrees to 45 degrees.

19. The light enhancement film according to claim 12, wherein a length between every two parallel edges of the largest cross-sectional area of each hexagonal cylindrical lens is in a range from 30 μm to 160 μm.

* * * * *